United States Patent [19]

Yasoshima

[11] 4,076,107
[45] Feb. 28, 1978

[54] VEHICLE CLUTCH BRAKE STEERING CONTROLS WITH TRANSMISSION NEUTRALIZER

[75] Inventor: Kazuo Yasoshima, Komatsu, Japan

[73] Assignee: Kabushiki Kaisha Komatsu Seisakusho, Tokyo, Japan

[21] Appl. No.: 654,780

[22] Filed: Feb. 3, 1976

[51] Int. Cl.² .................. F16D 67/02; B60K 29/00
[52] U.S. Cl. .................. 192/4 A; 192/13 R
[58] Field of Search .................. 192/13 R, 4 A, 4 C

[56] References Cited

U.S. PATENT DOCUMENTS

| | | | |
|---|---|---|---|
| 1,572,943 | 2/1926 | McKinley | 192/13 R |
| 3,398,819 | 8/1968 | Ruhl et al. | 192/13 R |
| 3,494,449 | 2/1970 | Umeda et al. | 192/13 R |
| 3,498,427 | 3/1970 | Bingley | 192/13 R |
| 3,696,897 | 10/1972 | Kitano et al. | 192/13 R |
| 3,797,619 | 3/1974 | Suziki | 192/13 R |
| 3,815,697 | 6/1974 | Bridwell et al. | 192/4 A |

*Primary Examiner*—Benjamin W. Wyche
*Attorney, Agent, or Firm*—Armstrong, Nikaido & Marmelstein

[57] ABSTRACT

A steering control apparatus for a vehicle of the type having a pair of steering clutches and a pair of steering brakes which comprises a pair of steering control members, a control member for a speed change gear clutch, and a power transmission gear for transmitting power to driving wheels, wherein the steering control members are connected to the steering clutches and brakes in such a manner that the brakes are actuated without disengaging the clutches when the pair of steering control members are operated simultaneously, and the control member is connected to the steering brakes and the power transmission gear in such a manner that the steering brakes are actuated after disengagement of the power transmission gear when the control member is operated.

7 Claims, 3 Drawing Figures

VEHICLE CLUTCH BRAKE STEERING CONTROLS WITH TRANSMISSION NEUTRALIZER

BACKGROUND OF THE INVENTION

This invention relates to a control apparatus for vehicles which has steering clutches and steering brakes, and more particularly to a control apparatus which is adapted to disengage a speed change gear clutch in response to the running, stopping and braking of vehicles.

Conventional control apparatus of this type have a pair of steering control members (pedals or levers) which are coupled with a pair of steering clutches and a pair of steering brakes via a linkage. When a selected one of steering control members is actuated, the steering clutch for the actuated member is disengaged during which time one of the running devices of the vehicle is in free condition, and thereafter when the selected member is further operated, the steering brake is applied during which time the running device in the free condition is braked so as to be able to turn the vehicle slowly or rapidly. Therefore, when the pair of steering control members are actuated, both of the steering clutches are disengaged and, subsequently, both of the steering brakes are operated to stop the vehicle. If the vehicle is stopped on a sloped ground, it ascends the ground a moment since the running device is first in the free condition and then braked.

In addition, when the vehicle that is braked on the sloped ground during which time both of the steering clutches are disengaged and both of the steering brakes are applied is to be turned or started forwardly or rearwardly by releasing one of the steering control members which are both actuated, the steering clutch for the released member is engaged only after the steering brake for the released member is released when one of the running devices is in the free condition. Thus, this has led to a drawback in that the vehicle is subjected to a dangerous, unexpected turn until the running device in the free condition is driven.

A control apparatus as disclosed in U.S. Pat. No. 3,494,449 has been developed to eliminate the above-noted difficulties. Such a control apparatus is so arranged that when a selected one of a pair of steering control members is actuated, the steering clutch for the actuated member is disengaged, and as the selected member is further actuated, the steering brake therefor is applied so as to be able to control the slow or rapid turn of the vehicle. Thus, the driving power to the running devices is not interrupted during the running, stopping and braking of the vehicle, so that the running devices are prevented from becoming free and the vehicle is prevented from ascending for a moment or turning unexpectedly on a sloped ground. However, the difficlty with such an arrangement is that there is required a very large amount of braking force until the torque converter is stalled or the engine is stopped because a brake is applied without interrupting the driving force to the running devices, thus normally requiring an additional procedure to disengage the main clutch for a power transmission device or to slip a speed change gear into neutral. Therefore, this prior art attempt necessitates a complicated control operation.

SUMMARY OF THE INVENTION

In accordance with the present invention, a steering control apparatus for a vehicle of the type having a pair of steering clutches and a pair of steering brakes which comprises a pair of steering control members, means for connectng said steering control members to said steering clutches and brakes in such a manner that said brakes are actuated without disengaging said clutches when said pair of steering control member are operated simultaneously, a control member for a speed change gear clutch, power transmission gear means for transmitting power to driving wheels, and means for connecting said control member to said steering brakes and said power transmission gear means in such a manner that said steering brakes are actuated after disengagement of said power transmission gear means when said control member is operated.

It is, therefore an object of the present invention to provide a steering control apparatus of the type having steering clutches and brakes in which the steering brakes can be actuated after disengagement of the power transmission gear when the control member for a speed change gear clutch is operated.

It is another object of the present invention to provide a steering control apparatus in which the vehicle can be stopped by a small braking force.

It is still another object of the present invention to provide a steering control apparatus in which one of the steering brakes can be actuated immediately after disengaging one of the steering clutches when turning the vehicle in one direction.

Other objects, features and advantages of the present invention will be readily apparent from the following description taken in conjunction with the accompanying drawings.

DETAILED DESCRIPTION OF THE PREFERRED EMBODIMENT

STEERING CONTROL SYSTEM

Figure 1:
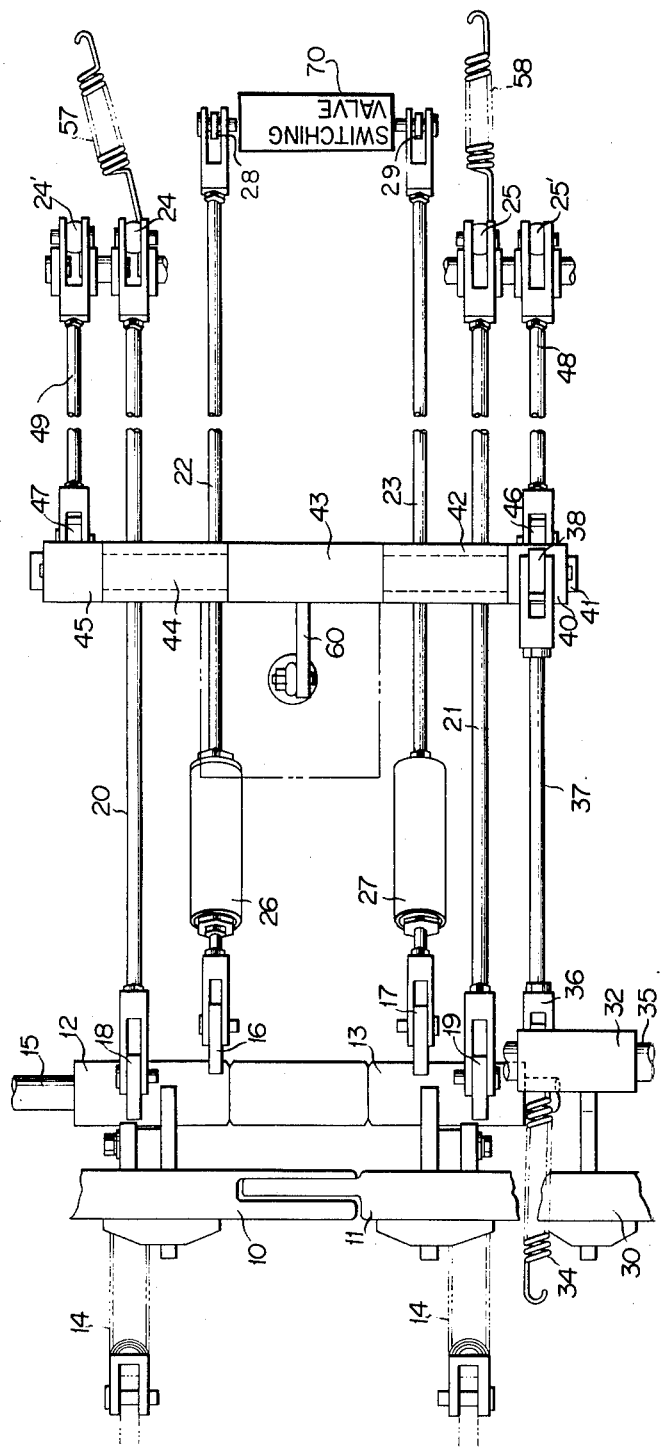
FIG. 1 is a plan view of the present invention.
Figure 2:
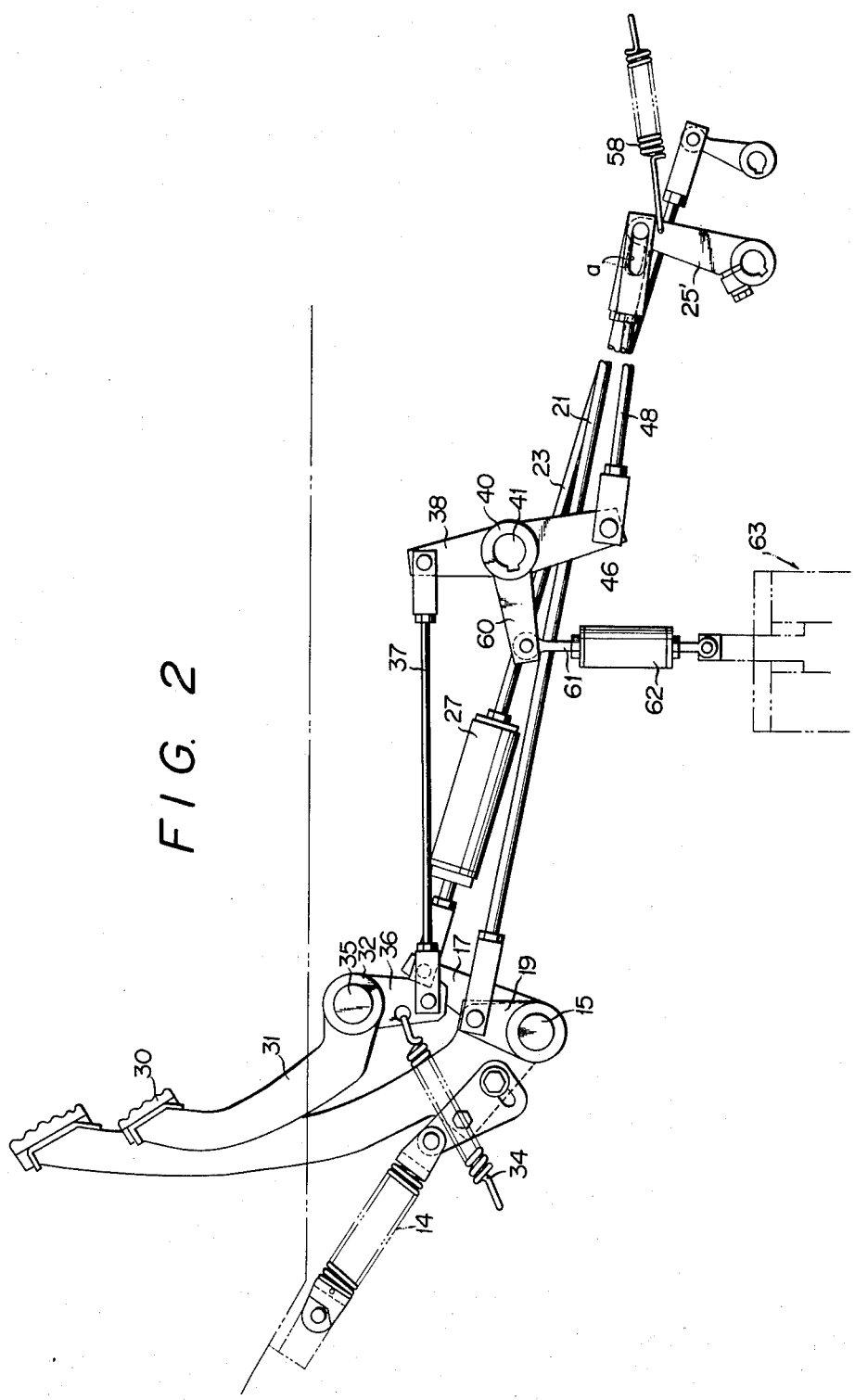
FIG. 2 is a side view of the present invention.

In the drawings, there are shown a pair of steering control members 10, 11 having their legs secured to a pair of shaft sleeves 12, 13, respectively, the members 10, 11 being normally biased by springs 14, 57 and 58 in the clockwise direction as viewed in FIG. 2. The shaft sleeves 12, 13 are rotatably journaled, but not axially slidable on a shaft 15. The sleeves 12, 13 rotate in follow-up relation to the up-and-down movement of the steering control members 10, 11. The shaft sleeves 12, 13 are provided on peripheral surfaces with a pair of clutch levers 16, 17 fixed thereto, respectively, and also with a pair of brake levers 18, 19 fixed thereto, respectively. The clutch levers 16, 17 are connected to a pair of clutch connecting rods 22, 23 at their one ends, respectively. The brake levers 18, 19 are connected to a pair of brake connecting rods 20, 21 at their one ends, respectively. The brake connecting rods 20, 21 are coupled at the other ends with a pair of brake actuating levers 24, 25, respectively, for unshown steering brake devices.

The clutch connecting rods 22, 23 include a pair of loose spring devices 26, 27, respectively, each having springs yieldable in one direction to extend the connecting rods. The clutch connecting rods 22, 23 are connected at the other ends with a pair of switching operation levers 28, 29, respectively, for a hydraulic switching valve 70 for disconnecting a steering clutch, the switching operation levers being adapted to supply oil to a clutch chamber for one of the steering control members 10, 11 when said one of the members is operated, and also adapted to be prevented from supplying oil to both clutch chambers for the members 10, 11 when both of the members are operated. The structure and function of a hydraulic switching valve such as valve 70 is described in detail in Umedal et al, U.S. Pat. No. 3,494,449.

With this arrangement, when the steering control member 11 is actuated, the brake connecting rod 21 and the clutch connecting rod 23 are both pulled by the shaft sleeve 13. The clutch connecting rod 23 actuates the switching operation lever 29 for the hydraulic switching valve for disengaging the steering clutch, thereby opening a clutch disengaging hydraulic circuit to direct fluid under pressure to the steering clutch so as to disengage the latter.

The clutch connecting rod 23 extends in one direction by the action of the loose spring device 27, so that the brake connecting rod 21 can be further pulled to rotate the brake actuating lever 25 for the steering brake device in the counterclockwise direction as viewed in FIG. 2 whereupon the brake is actuated thereby turning the vehicle slowly or rapidly. This operation also applies where the steering control member 10 is actuated.

When the steering control members 10, 11 are both actuated, the brake connecting levers 20, 21 and the clutch connecting levers 22, 23 are pulled by the shaft sleeves 12, 13. At this time, the arrangement is such that fluid under pressure for disconnecting the steering clutches is prevented from being delivered to the clutches which then remain in engagement, and both of the steering brakes are actuated.

SPEED CHANGE GEAR CLUTCH CONTROL SECTION

A control member 30 for connectng or disconnecting a speed change gear has a leg 31 secured to a shaft sleeve 32, the control member being normaly biased by a spring 34 and the springs 57, 58 in the clockwise direction as viewed in FIG. 2. The shaft sleeve 32 is rotatably journaled, but not axially slidable on a shaft 35. The shaft sleeve 32 rotates in follow-up relation to the up-and-down movement of the control member 30. The shaft sleeve is provided on a peripheral surface with a lever 36 fixed thereto, to which lever 36 there is connected one end of a connecting rod 37. The connecting rod 37 is connected at the other end with a lever 38 fixed to a shaft sleeve 40. The shaft sleeve 40 is fixed to a shaft 41 which in turn is fixed to shaft sleeves 43 and 45. The shaft 41 and the shaft sleeves 40, 43 and 45 are rotatably journaled, but not axially slidable on a pair of bearing sleeves 42, 44, and are rotated in follow-up relation to the swinging movement of the lever 38. The shaft sleeves 40, 45 are provided on peripheral surfaces with a pair of linkage brake levers 46, 47 with which a pair of brake connecting rods 48, 49 are coupled at their one ends.

The brake connecting rods 48, 49 are provided at the other ends with oblong holes with which there are engaged a pair of brake actuation levers 24', 25' for the unshown steering brake devices. The brake actuation levers 24', 25' are normally pressed against the right-hand walls of the oblong holes defined in the right ends of the brake connecting rods 48, 49 by the force from the springs 57, 58. The shaft sleeves 43 has its peripheral surface secured to a speed change gear clutch lever 60 to which one end of a speed change gear clutch connecting rod 61 is connected. The connecting rod 61 includes a loose spring device 62 having a spring yieldable in one direction to extend the connecting rod 61 and has the other end connected with a pressure reducing valve 63 of a speed change gear hydraulically controlling device.

Figure 3:
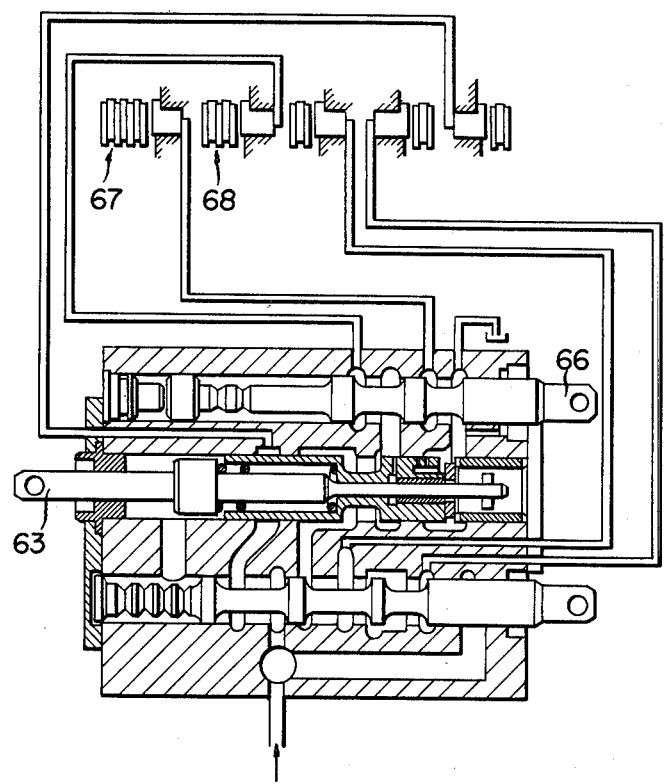
FIG. 3 is a cross-sectional view of a hydraulic control apparatus for a speed change gear of the present invention.

The pressure reducing valve 63 is fitted in the speed change gear hydraulically controlling device as shown in FIG. 3 and is adapted to reduce the pressure of fluid which is selectively directed to a forward clutch 67 or a rearward clutch 68 by a forward-rearward selective switching valve 66.

With this arrangement, when the control member 30 for connecting or disconnecting the speed change gear clutch, the shaft sleeve 32 is rotated to move the lever 36 and push the connecting rod 37 against the tension of the spring 34, whereupon the lever 38 is rotated in the clockwise direction as viewed in FIG. 2 and at the same time the speed change gear clutch lever 60 and the brake levers 46, 47 are likewise rotated in the clockwise direction. As a result, the speed change gear clutch connecting rod 61 causes the pressure reducing valve 63 to move toward the left in FIG. 3 so as to block the passageway of fluid under pressure to the forward and rearward clutches 67, 68 and simultaneously discharge the fluid under pressure within the clutches to disengage the clutches. Therefore, power from the engine is interrupted by the disengagement of the speed change gear clutch.

The speed change gear clutch connecting rod 61 extends in one direction by the action of the loose spring device 62, so that the brake linkage rods 48, 49 can be further pulled by the rotation of the shaft sleeves 40, 45 to rotate the brake actuating levers 24', 25' for the steering brake device in the counterclockwise direction as viewed in FIG. 2 whereupon the brake is actuated. Thus, there is not required a large amount of braking force which is the case with conventional apparatus, and nevertheless is provided braking action which can stop the vehicle positively.

The oblong holes *a* in the right ends of the brake connecting rods 20, 21 and 48, 49 serve to prevent the control member 30 from being interlockingly moved when actuating the steering control members 10, 11, and vice versa.

The following advantages are noted by using a hydraulically operated valve (an adjustable pressure reducing valve) for engaging and disengaging the speed change gear clutch.

1 A vehicle can be turned slowly from its stopped position on a sloped ground. After the speed change gear clutch control device is actuated during which time the vehicle is positively stopped even on a sloped ground by disengaging the speed change gear clutch and by actuating both of the steering brakes, the vehicle can be turned slowly by the half-engagement of the clutch and by operating either of the steering control members (when one of the members is operated, the steering clutch for the operated member is disengaged).

2. A vehicle can be started or rapidly on a sloped surface. The vehicle can be started slowly or rapidly on a sloped surface by the half-engagement of the speed change gear clutch control device and by simultaneously operating both of the steering control members (both of the steering clutches are disengaged).

3. A vehicle can approach gradually to an obstacle. When only the speed change gear clutch control member is operated, the vehicle is stopped by both of the actuated steering brakes, though the vehicle tends to run by inertia after the driving force is interrupted. Subsequently, when the member is operated again, the brake is released to move the vehicle slowly so as to permit the gradual movement of the vehicle toward an obstacle.

With this construction, when the control member 30 for engaging and disengaging the speed change clutch is actuated, the power transmission mechanism is first prevented from transmitting the power and, then, the steering brakes are actuated. Therefore, the vehicle can be stopped positively with a small amount of braking force.

What is claimed is:

1. A steering control apparatus for a vehicle of the type having a pair of steering clutches and a pair of steering brakes comprising a pair of steering control means, first connecting means for connecting said pair of steering control means to said steering clutches and brakes such that said brakes are actuated without disengaging said clutches when said pair of steering control means are operated simultaneously, and one of said steering brakes is actuated after disengaging one of said steering clutches when only one of said pair of steering control means is operated, a speed change control means for a speed change gear clutch, power transmission gear means for transmitting power to driving wheels, and second connecting means for connecting said speed change control means to said steering brakes and said power transmission gear means such that said steering brakes are actuated after disengagement of said power transmission gear means when said speed change control means is operated.

2. A steering control apparatus of claim 1 wherein said first connecting means include loose connecting means to allow further extention of joint members in one direction.

3. A steering control apparatus of claim 2 wherein said loose connecting means is a loose spring.

4. A steering control aparatus of claim 1 wherein said second connecting means include loose connecting means to allow further extention of joint members in one direction.

5. A steering control apparatus of claim 4 wherein said loose connecting means is a loose spring.

6. A steering control apparatus of claim 4 further comprising a pressure reducing valve connected to said loose connecting means.

7. A steering control apparatus of claim 6 wherein said pressure reducing valve is an adjustable pressure reducing valve.

* * * * *